(12) United States Patent
Dernoncourt et al.

(10) Patent No.: US 10,783,314 B2
(45) Date of Patent: Sep. 22, 2020

(54) EMPHASIZING KEY POINTS IN A SPEECH FILE AND STRUCTURING AN ASSOCIATED TRANSCRIPTION

(71) Applicant: Adobe Inc., San Jose, CA (US)

(72) Inventors: Franck Dernoncourt, San Jose, CA (US); Walter Wei-Tuh Chang, San Jose, CA (US); Seokhwan Kim, San Jose, CA (US); Sean Fitzgerald, Campbell, CA (US); Ragunandan Rao Malangully, San Jose, CA (US); Laurie Marie Byrum, Pleasanton, CA (US); Frederic Thevenet, San Francisco, CA (US); Carl Iwan Dockhorn, San Jose, CA (US)

(73) Assignee: Adobe Inc., San Jose, CA (US)

( * ) Notice: Subject to any disclaimer, the term of this patent is extended or adjusted under 35 U.S.C. 154(b) by 201 days.

(21) Appl. No.: 16/024,212

(22) Filed: Jun. 29, 2018

(65) Prior Publication Data
US 2020/0004803 A1 Jan. 2, 2020

(51) Int. Cl.
| | |
|---|---|
| *G06F 40/10* | (2020.01) |
| *G06F 40/106* | (2020.01) |
| *G10L 15/26* | (2006.01) |
| *G06F 40/14* | (2020.01) |
| *G06F 40/166* | (2020.01) |

(52) U.S. Cl.
CPC ............ *G06F 40/106* (2020.01); *G06F 40/14* (2020.01); *G06F 40/166* (2020.01); *G10L 15/26* (2013.01); *G06F 40/10* (2020.01)

(58) Field of Classification Search
CPC ...................................................... G06F 40/10
See application file for complete search history.

(56) References Cited

U.S. PATENT DOCUMENTS

| | | | | |
|---|---|---|---|---|
| 7,483,892 B1 * | 1/2009 | Sommer | ............. | G06F 16/3347 |
| 2008/0201130 A1 * | 8/2008 | Peters | ..................... | G06F 40/10 704/9 |
| 2014/0195897 A1 * | 7/2014 | Balinsky | ............... | G06F 16/345 715/254 |

FOREIGN PATENT DOCUMENTS

| | | | | |
|---|---|---|---|---|
| CA | 2397985 A1 * | 7/2001 | ........... | G06F 40/205 |
| EP | 3499384 A1 * | 6/2019 | ............. | G06N 5/003 |

OTHER PUBLICATIONS

Murray, G. et al., "Extractive summarization of meeting recordings", In Proc. 9th European Conference on Speech Communication and Technology, 2005, 4 pages.
(Continued)

*Primary Examiner* — Feng-Tzer Tzeng
(74) *Attorney, Agent, or Firm* — Finch & Maloney PLLC

(57) ABSTRACT

Techniques are disclosed for generating a structured transcription from a speech file. In an example embodiment, a structured transcription system receives a speech file comprising speech from one or more people and generates a navigable structured transcription object. The navigable structured transcription object may comprise one or more data structures representing multimedia content with which a user may navigate and interact via a user interface. Text and/or speech relating to the speech file can be selectively presented to the user (e.g., the text can be presented via a display, and the speech can be aurally presented via a speaker).

20 Claims, 13 Drawing Sheets

(56) References Cited

OTHER PUBLICATIONS

Ng, H.T., et al., "The CoNLL-2014 Shared Task on Grammatical Error Correction", Proceedings of the Eighteenth Conference on Computational Natural Language Learning: Shared Task, 2014, pp. 1-14.
Taylor, A. et al., "The Penn treebank: an overview", In Treebanks, Springer Netherlands, 2003, pp. 5-22.
Hearst, Marti A., "TextTiling: Segmenting text into multi-paragraph subtopic passages", Association for Computational Linguistics, 1997, vol. 23, pp. 33-64.
Riedl, M. and C. Biemann, "TopicTiling: a text segmentation algorithm based on LDA", Proceedings of the 2012 Student Research Workshop, 2012, pp. 37-42.
Yu, J. et al., "A DNN-HMM Approach to Story Segmentation", In Interspeech, 2016, 5 pages.
Lai, C. et al., "Automatic paragraph segmentation with lexical and prosodic features", Interspeech, 2016, 5 pages.

* cited by examiner

EMPHASIZING KEY POINTS IN A SPEECH FILE AND STRUCTURING AN ASSOCIATED TRANSCRIPTION

FIELD OF THE DISCLOSURE

This disclosure relates to techniques for performing processing and analysis on a speech audio file. In particular, this disclosure relates to structuring a transcription of a speech audio file.

BACKGROUND

Access to an increasingly large amount of information via the Internet and other information technologies requires appropriate enabling technology to allow the consumption of information in an efficient manner. Much of the content consumed by users comprises speech files, such as podcasts or audio recordings of a talk. This modality allows users to consume content in conditions where reading is not possible, such as when commuting to work or exercising.

Audio files are by their nature linear: typical consumption is costly timewise and current tools for consuming such content do not enable topic-specific filtering and navigation. Due to a variety of reasons such as time constraints, users may prefer to only listen to the most important portions of the speech files. Doubling the playback speed helps, but current methods do not provide for navigation of the portions that the listener wishes to consume. Additionally, some users prefer textual content over speech content, in which case they may prefer to read a structured transcript of the speech file with the key points highlighted.

Significant unsolved problems with respect to speech files involve (1) converting a speech file to a structured document; (2) automatically identifying and highlighting key or otherwise specific portions of a speech file; and (3) providing a convenient interface to the user to navigate through the "highlighted" speech file and consume the file in less time.

The field of automated summarization has focused on textual and, to a lesser extent, video summarization. A few studies on speech summarization have focused on extractive speech summarization, but abstractive speech summarization has yet to be meaningfully addressed. In addition, such studies haven't provided a convenient interface to the user allowing them to navigate through a structured and highlighted speech file.

DETAILED DESCRIPTION

A structured transcription system generates a structured transcription from a speech file. The structured transcription that is generated includes structured text and the corresponding speech file. The structured text and corresponding speech file are effectively sectioned or otherwise delineated into distinct portions that can be individually accessed, such as for purposes of selective playback. In this way, the speech file can be navigated on a sectional or otherwise selective basis. According to one embodiment of the present disclosure, the structured transcription system receives a speech file comprising speech from one or more persons and generates a navigable structured transcription object. A navigable structured transcription object comprises, for example, one or more data structures representing multimedia content with which a user may navigate and interact via a user interface.

In particular, according to one embodiment of the present disclosure techniques are described for providing a unique navigable view of a speech file. According to a first embodiment, a speech file is converted to a text file and then analyzed to generate a document tree that may be navigated via a user interface. In some such cases, the document tree groups various portions of text into sections that are arranged in a hierarchical or other structured manner. The document tree can be modified to incorporate both extractive and abstractive summaries of text in various sections of the text file. A user may then navigate the document tree via a user interface to view various portions of the structured text such as sections (e.g., a paragraph or set of paragraphs, a chapter, a sentence or set of sequential sentences, or any other portion of a given text file that can be individually accessed). Content from the extractive and abstractive summaries may be visually presented to the user during the navigation process, for example, utilizing the extractive summaries to perform highlighting of text. The speech file may also be incorporated during the navigation to play back (aural presentation) associated portions of the transcribed speech file as the user navigates through the document tree.

According to one embodiment of the present disclosure, a structured representation of a document is determined by first generating a word embedding for each word in a sentence and then determining whether a sentence concludes a section using a recurrent neural network.

According to one embodiment of the present disclosure, a highlighting of a textual representation of a speech file is performed by processing the speech file to generate a textual representation of said speech file and then highlight or not highlighting each sentence in the textural representation by using a classifier that generates a binary output based upon acoustic features associated with the speech file and term-frequency vectors computed for the textual representation.

Figure 1A:
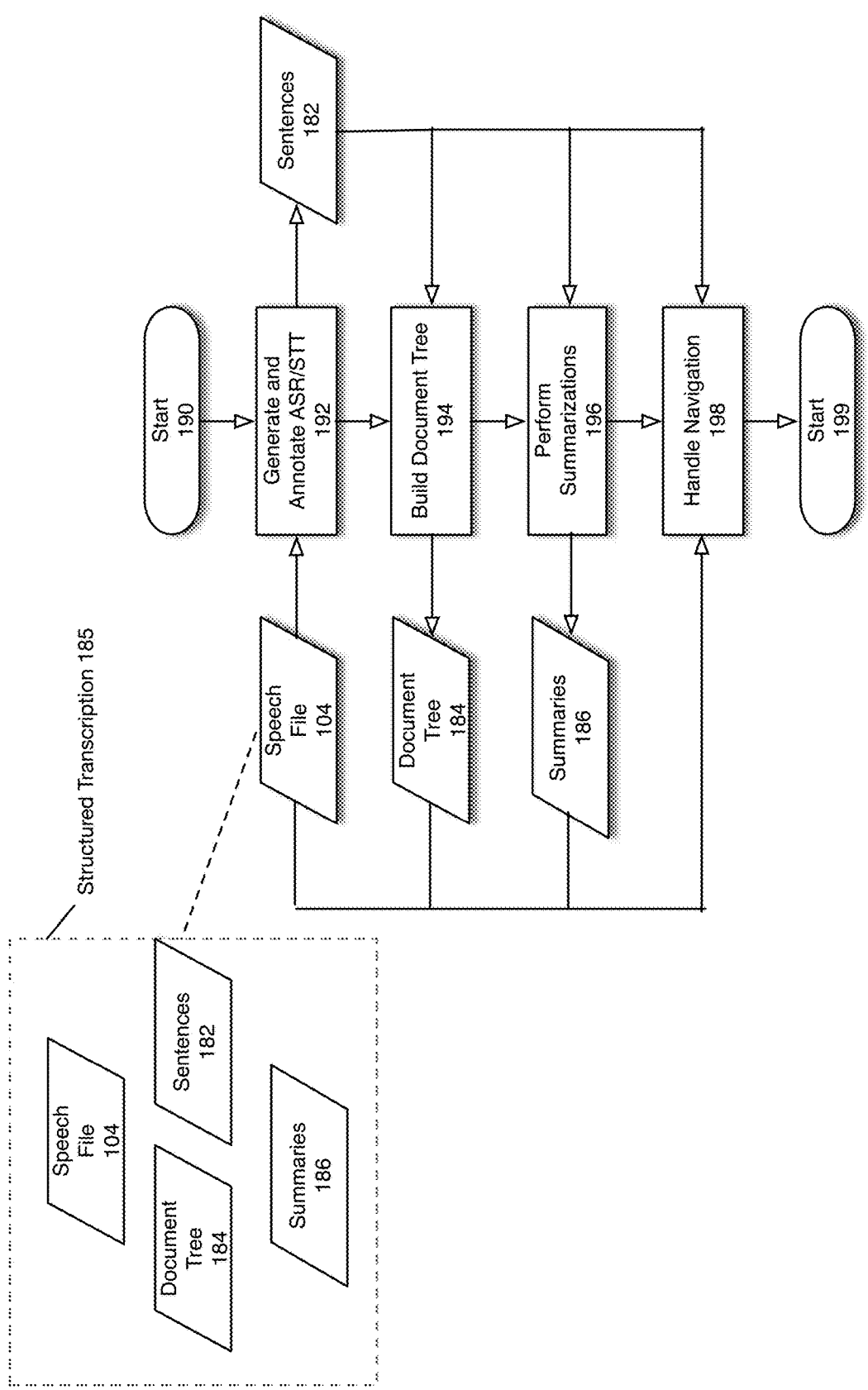
FIG. 1a is a high-level flowchart depicting an operation of a structured transcription system according to one embodiment of the present disclosure.

FIG. 1a is a high-level flowchart depicting an operation of a structured transcription system according to one embodiment of the present disclosure. The process is initiated in 190. In 192, a speech file 104 is received and processed using ASR ("Automatic Speech Recognition")/STT ("Speech to Text") to convert speech file 104 to a textual representation. As part of the annotation process, sentences 182 are determined. In particular, as will be described in more detail below, sentences 182 may be determined by analyzing the textual representation to determine sentence boundaries and punctuation. In 194, sentences 182 determined in 192 are processed to build a document tree 184 data structure capturing hierarchical information about the document such as paragraph groupings of sentences 182, sections, etc. In 196, the sentences 182 determined in 192 are processed to generate summaries 186. As will be described below, the summaries 186 may comprise one or both of extractive and abstractive summaries.

Collectively speech file 104, document tree 184, sentences 182 and summaries 186 may comprise a structured transcription 185 of speech file 104, which may be utilized as multimedia content to allow a user to navigate speech file 104 in a structured and contextual manner. Accordingly, in 198, a user may interact with a user interface to navigate the various media determined in 192, 194 and 196. In particular, in 198 speech file 104, sentences 182, document tree 184 and summaries 186 are utilized to perform navigation functions to allow a user to interact with the original speech file 104 using the generated structured textual and summarized representation (i.e., structured transcription 185). During navigation a user may also be presented with the original speech representation in the context of the generated textual and summarized representation. The process ends in 199.

Figure 1B:
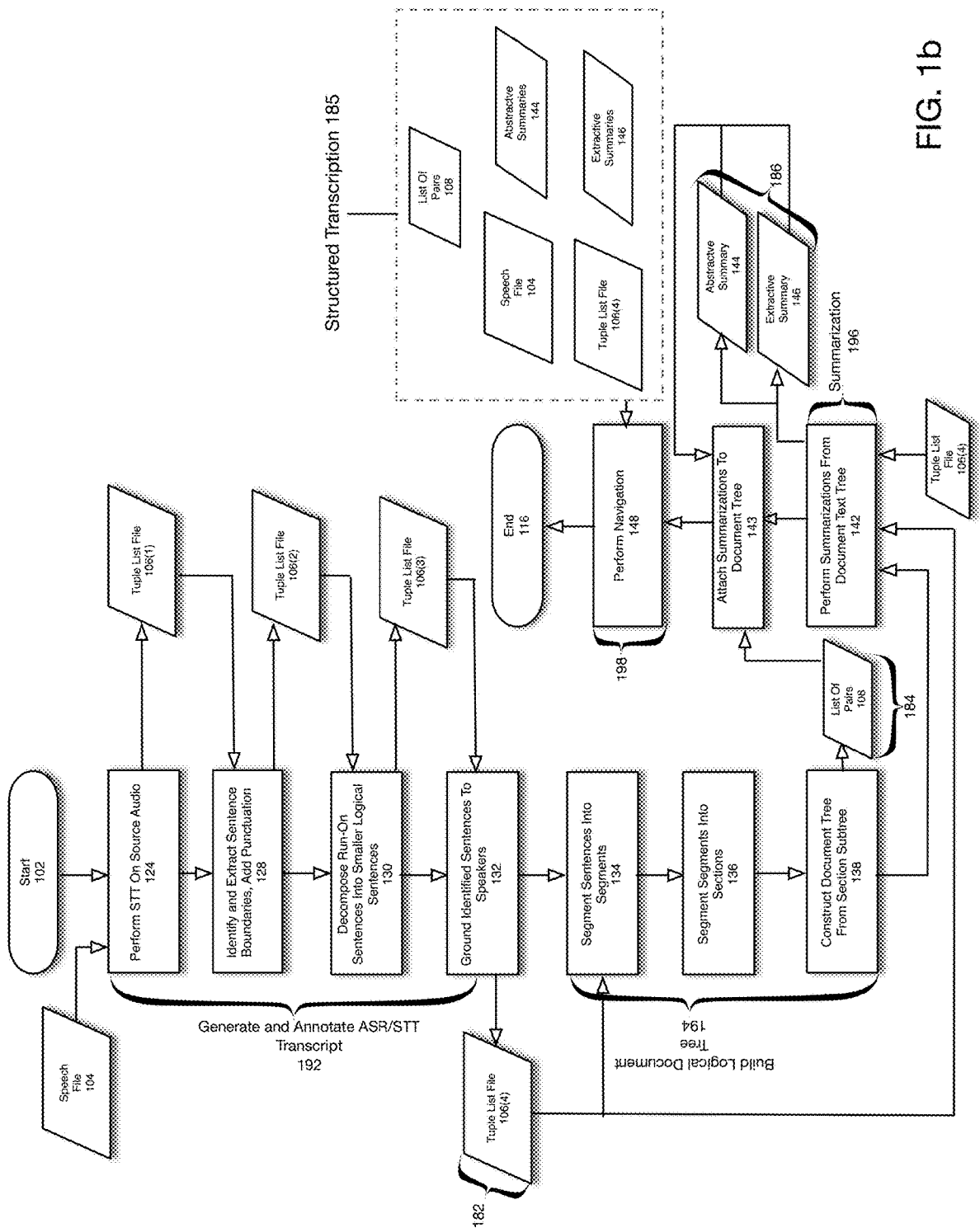
FIG. 1b is a detailed flowchart depicting an operation of a structured transcription system according to one embodiment of the present disclosure.

FIG. 1b is a detailed flowchart depicting an operation of a structured transcription system according to one embodiment of the present disclosure. The process shown in FIG. 1b represents a more detailed depiction of the high-level process shown in FIG. 1a. Further, FIG. 1b shows specific example data structures for representing various elements shown in FIG. 1a. For example, and as will be described in more detail below, sentences 182 may be represented using tuple list file 106(4), document tree may be represented by list of pairs 108, etc. Referring to FIG. 1b, in a first phase (192) a transcript is generated and annotated using automatic speech recognition (i.e., speech to text techniques) to ultimately generate sentences 182. In a second phase (194) a logical document tree 184 is constructed based upon the sentences identified in the first phase. In a third phase (196), summarizations are performed on the sentences determined in the second phase to generate both extractive and abstractive summaries. As previously noted, the document tree 184, speech file 104, summaries 186 and sentences 182 comprise a structured transcription of speech file 104. In a fourth phase (148), navigation events are handled to allow a user to navigate the structured transcription 185 in a unified manner.

It is assumed for purposes of this discussion that speech file 104 is to be processed by a structured transcription system to generate a navigable structured transcription 185. Speech file 104 may be an audio file of human speech comprising one or more speakers. According to some embodiments of the present disclosure, speech file 104 may be an audio file comprising audio samples taken at a specific sampling rate and having a specific bit resolution. For example, according to one embodiment of the present disclosure, speech file 104 may be an audio file sampled at 8 kHz using 16-bit samples.

The process is initiated in 102. In 124-132, a transcript is generated and annotated using ASR/STT to generate sentences 182. With respect to the ASR/STT process, in 124, speech file 104 is processed using STT to generate tuple list file 106(1). According to one embodiment of the present disclosure, tuple list file 106(1) may comprise the following structure:

Word ID,
Word,
Timestamp of the beginning of the word in the recording
Timestamp of the end of the word in the recording.

For example, the following tuple list files might be generated for the words "hello" and "world" in a speech file 104:
[(0, 'hello', 325, 750), (1, 'world', 1203, 1697)]

According to one embodiment of the present disclosure, the timestamps 325, 750, 1203 and 1697 are expressed in milliseconds and measure how much time has elapsed since the beginning of the speech file 104. The tuple list data structure is only one example and many other data structures are possible.

In 128, tuple list file 106(1) is processed to identify and extract sentence boundaries and add punctuation as appropriate to generate tuple file list 106(2). According to one embodiment of the present disclosure, tuple list file 106(2) may comprise the following structure:

Sentence ID,
Word ID
Word,
Timestamp of the beginning of the word in the recording
Timestamp of the end of the word in the recording.

For example, the following tuple list files might be generated for the words "hello" and "world" in a speech file 104:
[(0, 0, 'hello', 325, 750), (0, 1, 'world', 1203, 1697), (0, 2, '!', 1697, 1697)]

Note the introduction of the exclamation point "!", which has been added as punctuation.

In 130 tuple list file 106(2) is processed to decompose run-on sentences into smaller logical sentences to generate tuple list file 106(3). According to one embodiment of the present disclosure, tuple list file 106(3) may utilize data structures similar to those described above with respect to tuple list file 106(2).

In 132, tuple list file 106(3) is processed to associate identified sentences 182 with particular speakers to generate tuple list file 106(4). In particular, according to one embodiment of the present disclosure multiple speakers may be speaking in speech file 104. In 132, these multiple speakers are respectively associated with particular sentences 182 identified in 124, 128 and 130. Tuple list file 106(4) comprises only one possible one data structure for representing sentences 182 shown in FIG. 1a. According to one embodiment of the present disclosure, tuple list file 106(4) may comprise the following structure:

Sentence ID
Speaker ID
Word ID
Word
Timestamp of the beginning of the word in the recording
Timestamp of the end of the word in the recording According to alternative embodiments, other data structures may be utilized.

For example, the following tuple list files might be generated for the words "hello" and "world" in a speech file 104:

[(0, 0, 0, 'hello', 325, 750), (0, 0, 1, world, 1203, 1697), (0, 0, 2, '!', 1697, 1697)]

In 134, 136 and 138 tuple list file 106(4) (sentences 182) is processed to build a logical document tree 184 representing the inherent sentence structure. In particular, in 134, tuple list file 106(4) is processed to segment sentences 182 into segments, which may comprise a subtree. In 136, the segments determined in 134 are segmented into sections. In 138, a document tree 184 is constructed from a section subtree generated in 136 to generate a list of pairs 108. List of pairs 108 comprises one data structure for representing document tree 184 shown in FIG. 1a. According to alternative embodiments, other data structures may be utilized.

According to one embodiment of the present disclosure, list of pairs 108 may comprise the following structure:
Paragraph ID
Sentence ID For simplicity of explanation, it is assumed that the document structure has only 2 levels: paragraphs and sentences 182. However, with similar technique, additional abstract levels could be utilized, e.g. a third level that would represent a section (section contains several paragraphs).

For example, the following list of pairs 108 might be generated for a document comprising 2 paragraphs, the first one containing 3 sentences 182 and the second one containing 4 sentences 182:

[(0,0), (0, 1), (0, 2), (1, 3), (1, 4), (1, 5), (1, 6)]

As described below in more detail, according to one embodiment of the present disclosure, the TextTiling may be utilized to perform 194 (134, 136 and 138). As will be appreciated the TextTiling algorithm leverages Patterns of lexical co-occurrence and distribution to automatically infer multi-paragraph topical structure. According to an alternative embodiment of the present disclosure an extension of the TextTiling algorithm, which is also an unsupervised approach, may be utilized which relies on Latent Dirichlet Allocation (LDA) based representations instead of term vectors. According to yet another embodiment, a supervised deep learning model such as a deep neural network may be utilized when an appropriate training set is available. With respect to the use of the TextTiling algorithm, according to one embodiment of the present disclosure, tuple list file 106(4) may be converted into a list of strings wherein each string represents one sentence.

According to an alternative embodiment of the present disclosure, a bidirectional LSTM ("Long Short Term Memory") network is employed to receive each word of a sentence as input and generate a binary output (0 or 1) as output indicating whether the sentence is the end of a section (i.e., 0 means it is not the end of a section and 1 means it is the end of a section). Each word in a sentence is mapped to an embedding and provided as input to the LSTM, which generates a binary output as to whether a given sentence ends a section. According to one embodiment of the present disclosure, a 2-level bidirectional LSTM is utilized. The first level generates as output a sentence embedding. The output of the $1^{st}$ level bidirectional LSTM is the hidden state of its last timestep. That output of the first level bidirectional LSTM is then provided to the second level of the LSTM, which generates a binary output indicating whether the sentence is the end of a section. It will be appreciated that an LSTM network may be trained using a backpropagation through time algorithm.

In 142, summarization is performed based upon the identified sentences 182 determined in 132. In particular, in 142, tuple list file 106(4) is processed to generate one or more summaries 186. According to one embodiment of the present disclosure and as described below with respect to FIG. 1b, tuple list file 106(4) may be processed to generate both an abstractive 144 and an extractive summary 146. According to one embodiment of the present disclosure, the extractive summary 146 may be utilized to generate highlights. Abstractive summary 144 and extractive summary 146 represent examples of summaries 186 shown in FIG. 1a. According to one embodiment of the present disclosure, one or both abstractive summaries 144 and extractive summaries 146 are added to document tree According to one embodiment of the present disclosure, in order to generate extractive summary tuple list file 106(4) (list of strings) is processed to generate a list of integers, wherein each integer corresponds to a string identifier that pertains to a string that should be included in the extractive summary.

According to one embodiment of the present disclosure, abstractive summary is generated by receiving a string representing the entire text and generating as output a string that represents the abstract.

For both the extractive summarizer and the abstractive summarizer, the summary may be generated for any level of the documents (e.g., the entire document, or for each paragraph or section, in which case each is summary is mapped to the paragraph or section through the corresponding paragraph ID or section ID).

Speech file 104, tuple list 106(4), list of pairs 108, abstractive summarization 144 and extractive summaries 146 represent a structured transcription 185 of speech file 104. In 148, a user may interact with a user interface to perform navigation of structured transcription 185. A process for performing navigation of structured transcription 185 is described below with respect to FIG. 1d.

Figure 1C:
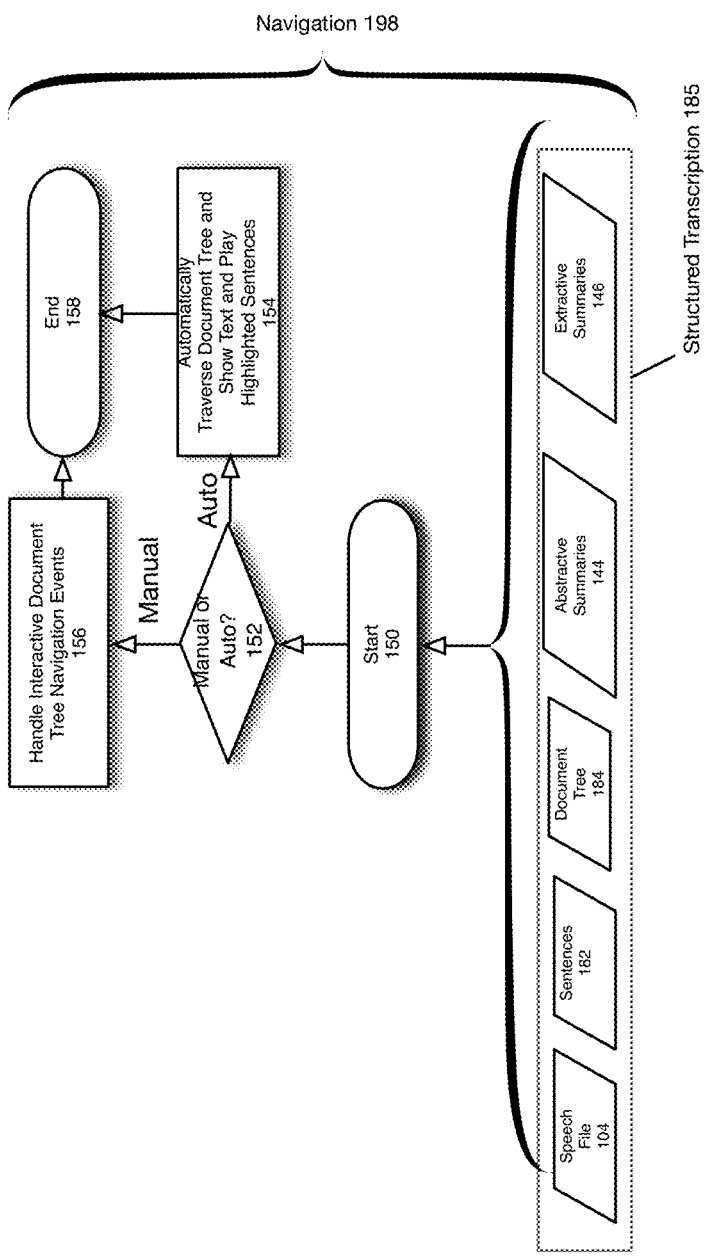
FIG. 1c is a flowchart depicting a high-level navigation process according to one embodiment of the present disclosure.

FIG. 1c is a flowchart depicting a high-level navigation process according to one embodiment of the present disclosure. The process shown in FIG. 1c corresponds to 198 of FIG. 1a. The process is initiated in 150 in which structured transcription 150 comprising speech file 104, sentences 182, document tree 184, abstractive summaries 144 and extractive summaries 146 are received as input. In 152, a user selection is received to determine whether either a manual or automatic mode should be engaged. If the manual mode is selected ('Manual' branch of 152), interactive document tree navigation is engaged, and navigation events are handled. On the other hand ('Automatic' branch of 152), an automatic traversal of the document tree 184 is performed and text and speech relating to the document tree 184 are automatically presented to the user in a prescribed order. For instance, the text is presented via a display and the speech is aurally presented via a speaker. The process ends in 158.

Figure 1D:
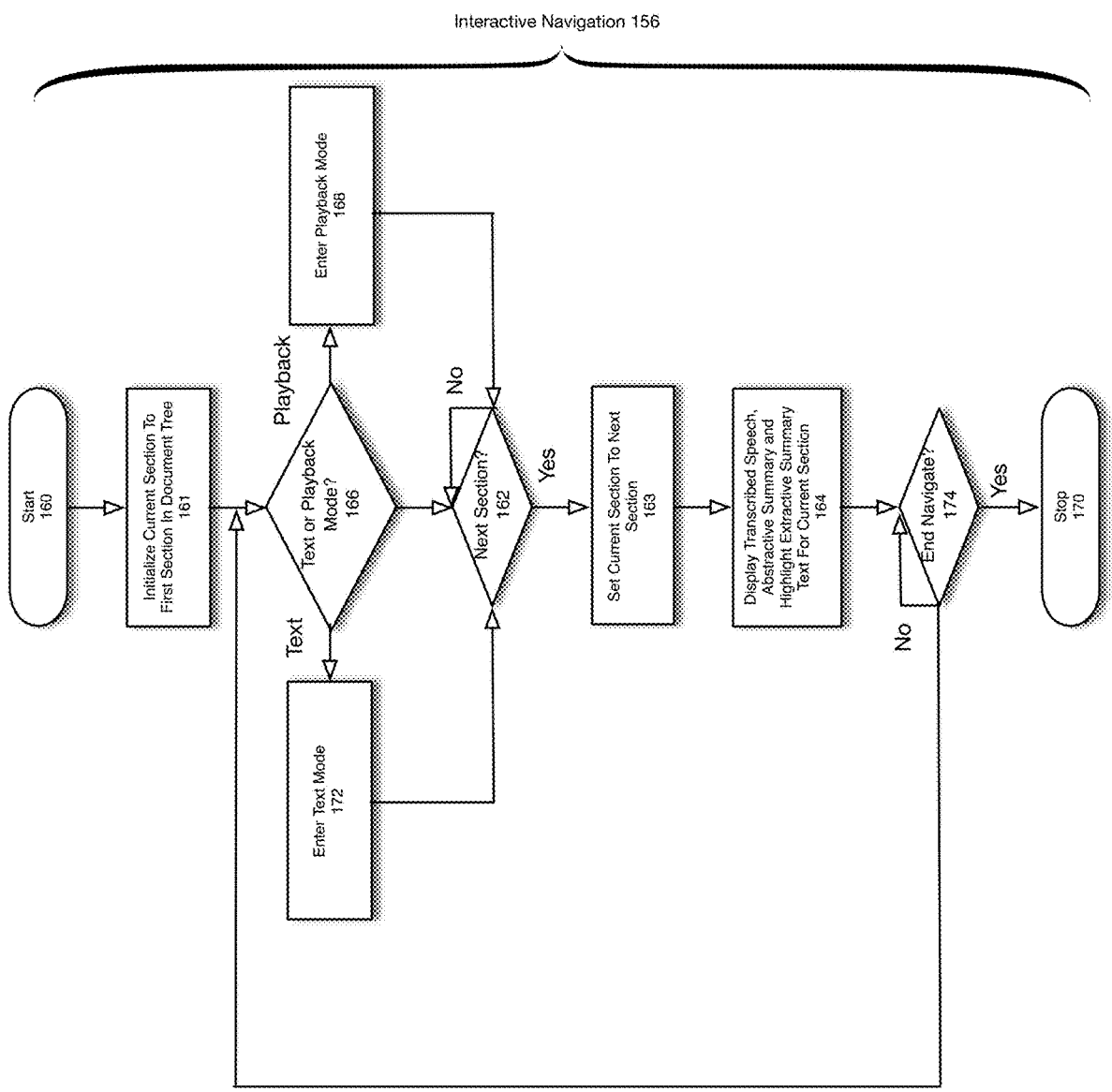
FIG. 1d is a flowchart depicting an operation of an interactive navigation mode according to one embodiment of the present disclosure.

FIG. 1d is a flowchart depicting an operation of an interactive navigation mode according to one embodiment of the present disclosure. The process shown in FIG. 1d pertains to 156 of FIG. 1c. The process is initiated in 160. In 161, the current section is initialized to the first section in the document tree 184. In 166, it is determined whether a text or playback mode should be engaged. If the playback mode is engaged in 168, the playback mode is engaged. Otherwise, the text mode is engaged in 172.

In 162, it is determined whether the user has selected to advance to the next section. If not ('No' branch of 162), flow continues with 162. If so (Yes' branch of 162) flow continues with 163 and the current section is set to the next section in the document tree 184. In 164, the transcribed speech, abstractive and extractive summaries are displayed with highlights. In 174, it is determined whether the navigation process should end. If so (Yes' branch of 174), the process ends in 170. Otherwise, flow continues with 166. Although FIG. 1*d* only shows the ability to advance to the next section, according to alternative embodiments, the user may be able to proceed to previous sections or otherwise navigate backwards.

According to one embodiment of the present disclosure, three modalities are provided to consume summaries. First, an abstract may be displayed (can either be read by the user or played back to the user). Second, an extract may be displayed (can either be read by the user or played back to the user). Third, highlights are displayed, wherein the highlighted sentences correspond to sentences selected by the extractive summarizer.

Figure 1E:
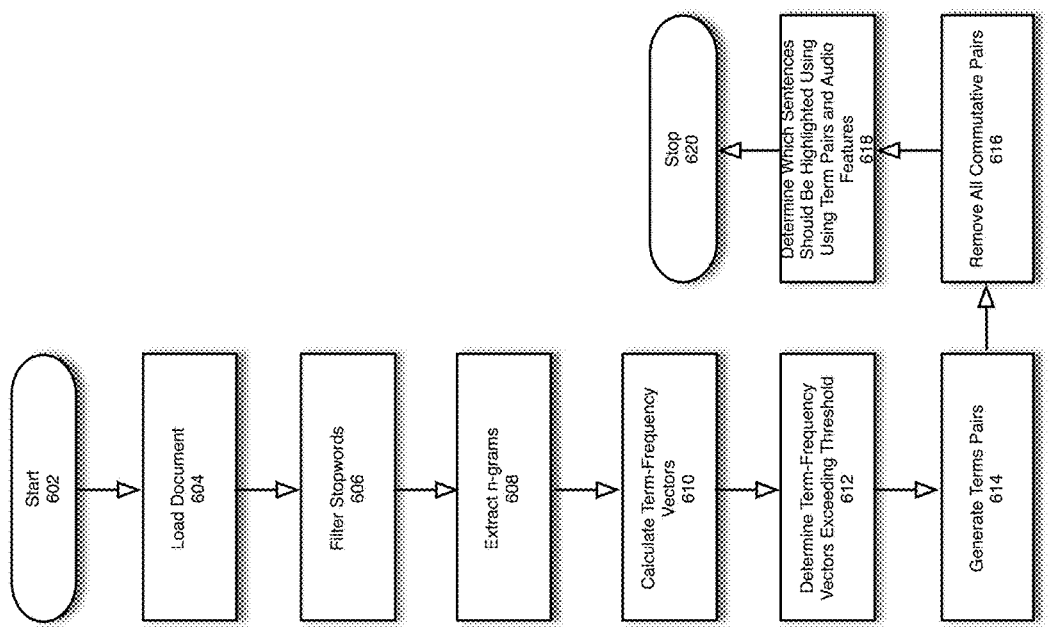
FIG. 1e is a flowchart of a process for performing sentence highlighting according to one embodiment of the present disclosure.

FIG. 1*e* is a flowchart of a process for performing sentence highlighting according to one embodiment of the present disclosure. The process is initiated in 602. In 604, a document for which sentence highlighting is to be performed is loaded. In 606, stop words such as punctuation including ".", "!", as well as articles such as "The" or "A" are filtered from the document. In 608, a list of all n-grams are extracted from the document. As will be appreciated, an n-gram is a contiguous sequence of n items from a given sample of text or speech. For example, for the sentence "I live in San Jose", the 2-grams in the sentence are ("I", "live"), ("live", "in"), ("in", "San"), ("San", "Jose"). According to alternative embodiments, either a 3-gram or 4-gram is generated.

In 610, term-frequency vectors are generated from the list of n-grams in 608. A term-frequency vector is a tuple, whose first component is an n-gram and whose second component is the frequency of occurrence of the n-gram in the document. In 612, the term-frequency vectors determined in 610 exceeding a pre-defined frequency of occurrence are determined. That is, according to one embodiment of the present disclosure, all term-frequency vectors having a frequency of occurrence greater than a pre-defined threshold are determined. In 614, all combinations (cross-product) of term-frequency vectors determined in 612 exceeding the pre-defined threshold are generated. For example, if the following term-frequency pairs exceeding the pre-defined threshold in 612 were {("San", "Jose"), ("I", "live"), ("in", "San")}, the following term-frequency pairs would be generated {{("San", "Jose"), ("I", "live")}, {("San", "Jose"), ("in", "San")}, {("I", "live"), ("in", "San")}}. In 616, all commutative pairs are removed, (i.e., all pairs that are invariant upon exchanging their order). In 618, sentences in the document are highlighted based upon the commutative pairs determined in 616 as well as a set of acoustic features. A more detailed process for determining whether a sentence should be highlighted is shown in FIG. 1*f*.

Figure 1F:
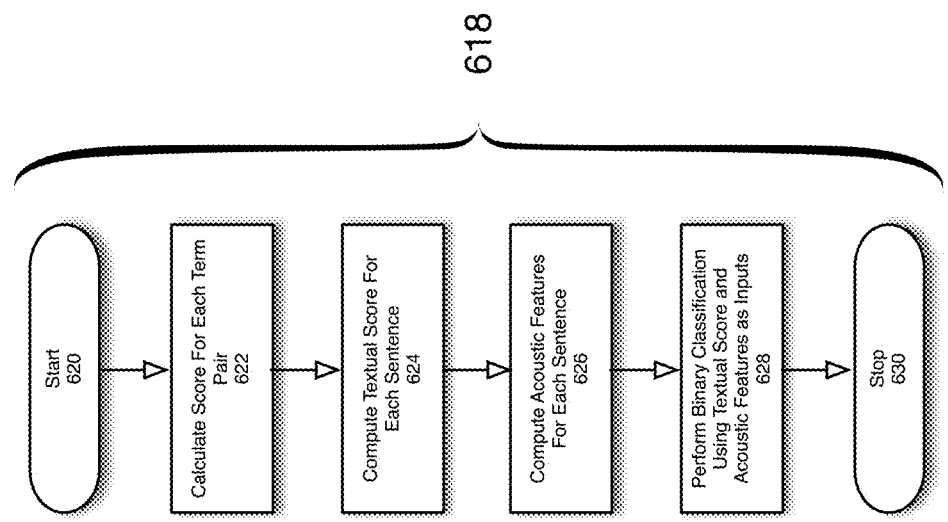
FIG. 1f is a flowchart of a process for determining whether a sentence should be highlighted according to one embodiment of the present disclosure.

FIG. 1*f* is a flowchart of a process for determining whether a sentence should be highlighted according to one embodiment of the present disclosure. The process shown in FIG. 1*f* corresponds to 618 of FIG. 1*e*. The process is initiated in 620. In 622, a score is computed for each non-commutative term-pair determined in 616. According to one embodiment of the present disclosure, the score may be computed by summing the frequency of each term of the term pair. In 624, a textual score is computed for each sentence in the document. According to one embodiment of the present disclosure, the textual score for a sentence is computed as the largest term-pair score for all term pairs contained in the sentence. In 626, acoustic features are computed for each sentence. Acoustic features may include such elements as mel-frequency cepstral coefficients, F0, etc. These acoustic features may indicate whether a sentence should be highlighted such as the intonation of the speaker, the loudness, etc. In 628, a binary classification process is performed using the acoustic features determined in 626 as well as the sentence textual score determined in 624 as input features. The output of the binary classifier indicates whether the sentence should be highlighted. The process ends in 630. According to one embodiment of the present disclosure, the binary classifier utilized in 624 may be trained using labeled training data indicating whether a sentence is indeed highlighted. According to one embodiment, a logistic regression algorithm or deep neural network may be utilized as the binary classifier.

Identification of Sentence Boundaries and Adding Punctuation

Figure 2A:
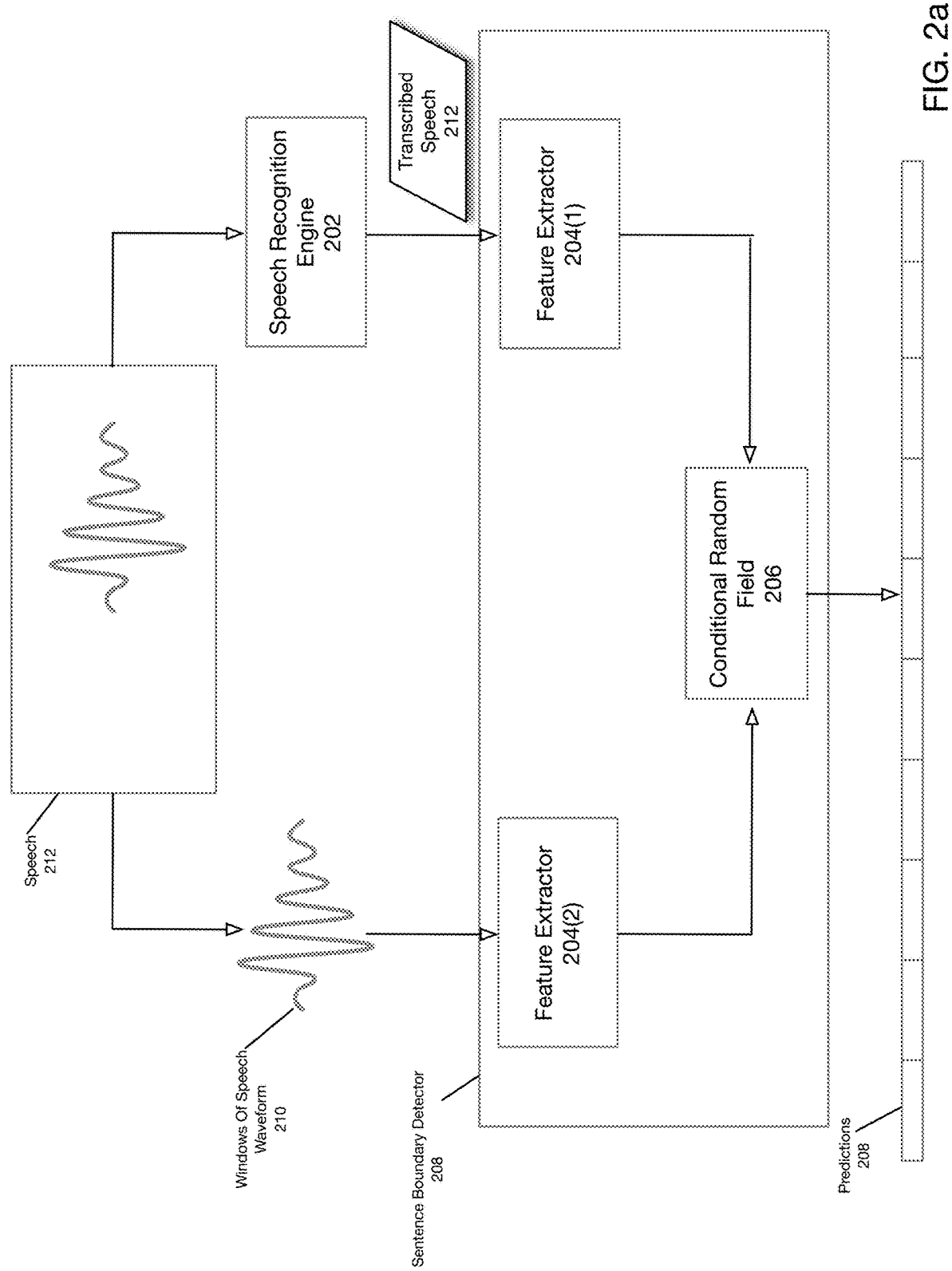
FIG. 2a is a block diagram depicting an operation of sentence boundary detector according to one embodiment of the present disclosure.

FIG. 2*a* is a block diagram depicting an operation of sentence boundary detector according to one embodiment of the present disclosure. The integration of a sentence boundary detector into a structured transcription system is described below with respect to FIG. 3*a*. As shown in FIG. 2*a*, speech 212 is provided to speech recognition engine, which generates a speech transcription. Speech 212 is also segmented into windows of speech waveform 210.

Sentence boundary detector 208 receives windows of speech waveform 210 and transcribed speech 212, which are respectively processed by feature extractor 204(2) and 204(1), which are in turn provided to conditional random field 206. Conditional random field 206 generates predictions 208. According to one embodiment of the present disclosure, conditional random field may be replaced by a recurrent neural network. Or, a combination of both may be employed.

Constituency-Based Parsing Tree Run-on Sentence Detection

Figure 2B:
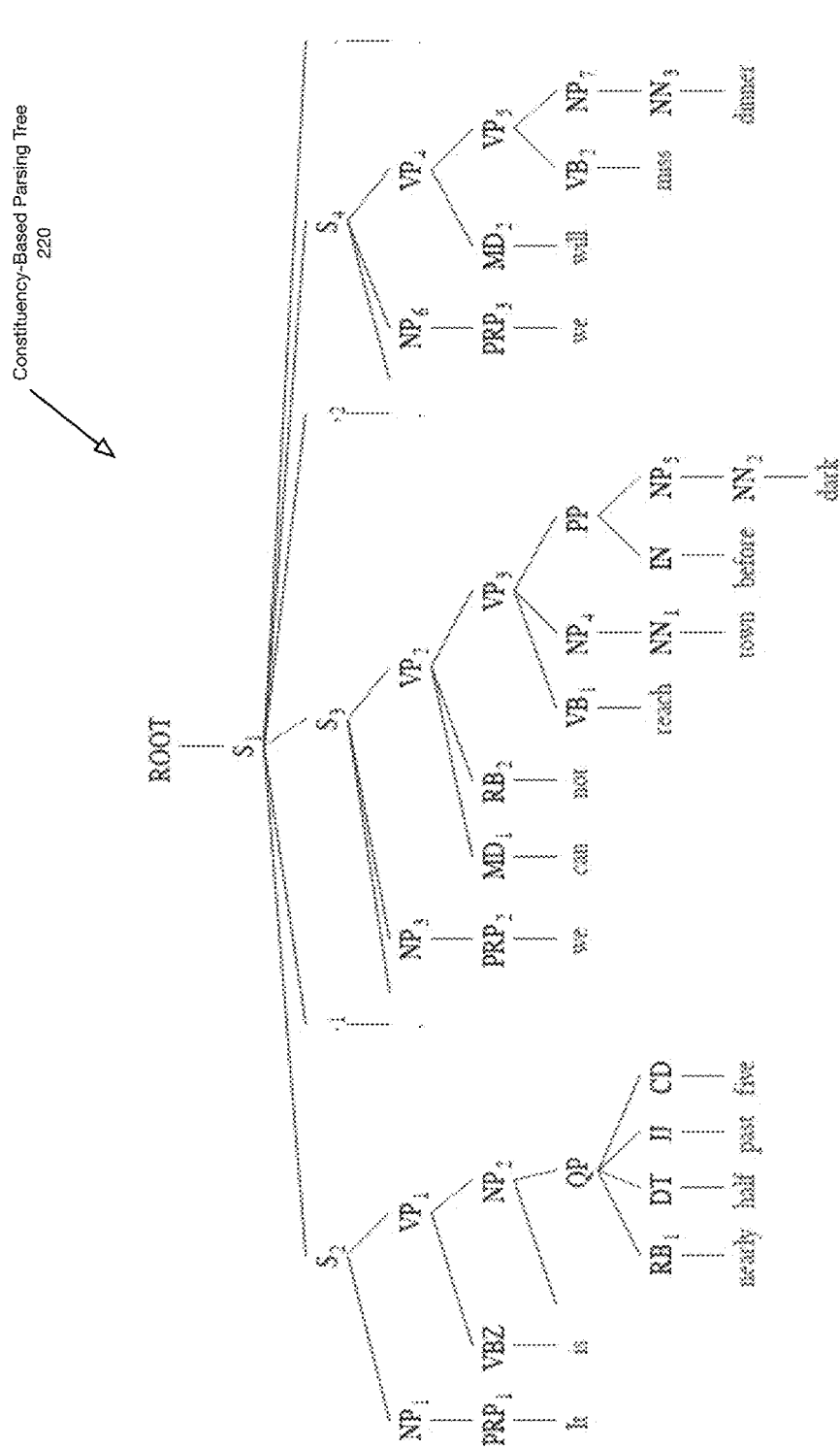
FIG. 2b depicts a tree structure for performing constituency-based parsing of a sentence to determine run-on sentences according to one embodiment of the present disclosure.

FIG. 2*b* depicts a tree structure for performing constituency-based parsing of a sentence to determine run-on sentences according to one embodiment of the present disclosure. According to one embodiment of the present disclosure, a set of heuristics based on the constituency-based parsing tree of a sentence is used to determine whether the sentence may be broken down into several, semantically independent sentences 182. One example of such heuristic is cutting a sentence based on each time a S node in a constituency-based parsing tree is directly linked to the ROOT note (following the Penn Treebank syntactic tagset). In particular, the term "directly" implies that there is no node between the S node and the ROOT note that isn't an S node.

For example, FIG. 2*b* shows a constituency-based parsing tree 220 for the run-on sentence "It is nearly half past five, we cannot reach town before dark, we will miss dinner". A set of heuristics based on the constituency-based parsing tree of a sentence may be utilized to determine whether it may be broken down into several, semantically independent sentences 182.

Ordered Structured Representation (Document Tree)

According to one embodiment of the present disclosure, the TextTiling may be utilized to generate document tree 184. As will be appreciated the TextTiling algorithm leverages patterns of lexical co-occurrence and distribution to automatically infer multi-paragraph topical structure. According to an alternative embodiment an extension of the TextTiling algorithm, which is also an unsupervised approach, may be utilized which relies on LDA-based representations instead of term vectors. According to yet another embodiment, a bidirectional LSTM as described above with respect to FIG. 1b may be employed to determine sections in a document.

Figure 3A:
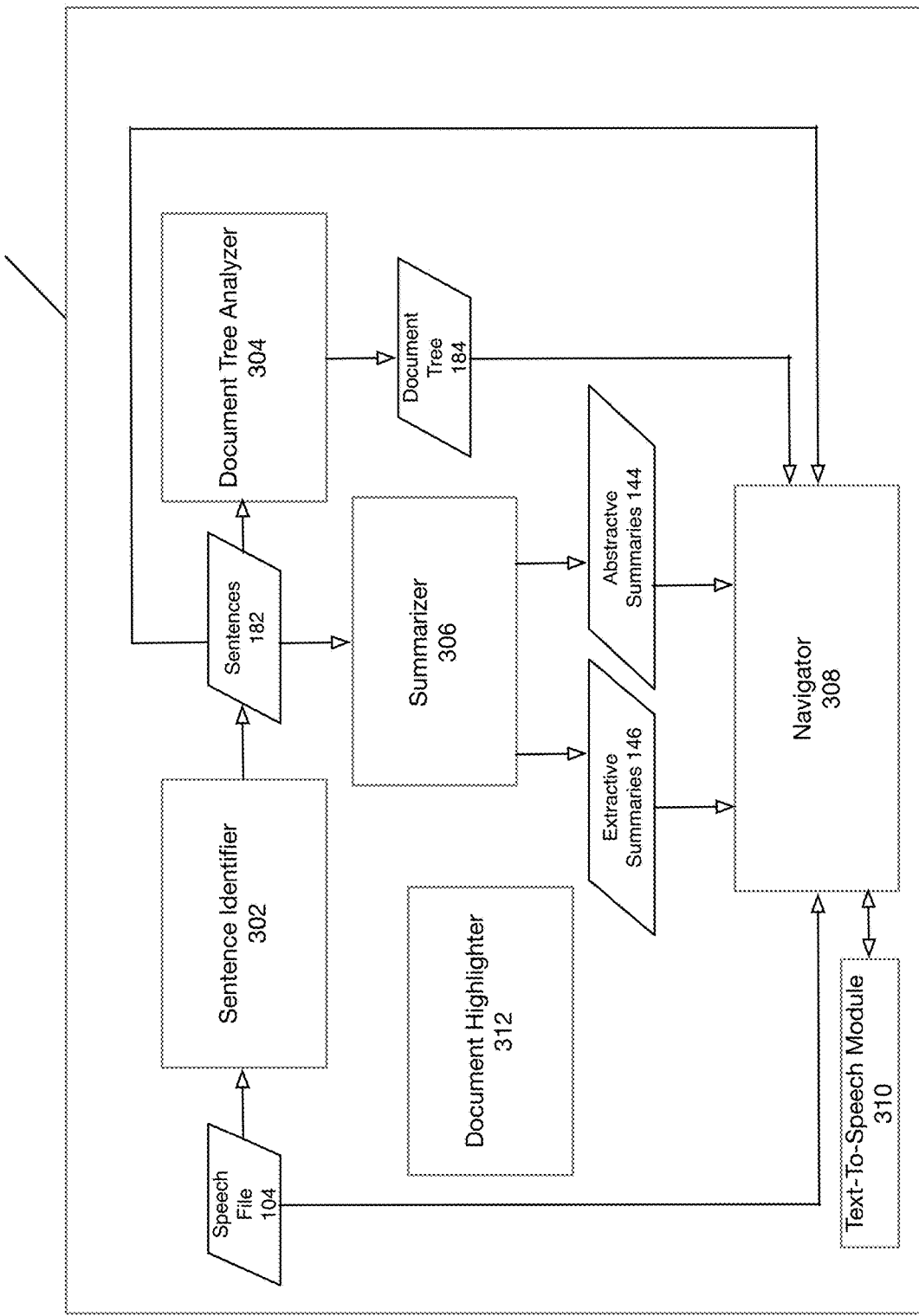
FIG. 3a is a block diagram of a structured transcription system according to one embodiment of the present disclosure.

FIG. 3a is a block diagram of a structured transcription system according to one embodiment of the present disclosure. As shown in FIG. 3a, structured transcription system comprises sentence identifier 302, document tree analyzer 304, summarizer 306, navigator 308, document highlighter 310 and text-to-speech module 310. Speech file 104 is received by sentence identifier 302, which generates sentences 182. According to one embodiment of the present disclosure, document tree analyzer 304 may comprise a bidirectional LSTM, which may perform a determination of sections in a document as described above with respect to FIG. 3a. Sentences 182 are provided to document tree analyzer 304, which generates document tree 184. Sentences 182 are also provided to summarizer 306, which generates extractive summaries 146 and abstractive summaries 144. Extractive summaries 146, abstractive summaries 144, document tree 184 and speech file 104 are provided to navigator 308, which in conjunction with text-to-speech module 310 provides for navigation of speech file 104 that has been converted into a structured transcription 185.

Document highlighter 310 may perform highlighting of a document as described above with respect to FIGS. 1e-1f. In particular, document highlighter may further comprise modules for performing operations of determining term-frequency vectors and binary classification based upon term-frequency vectors and acoustic features as described above with respect to FIGS. 1e-1f.

Figure 3B:
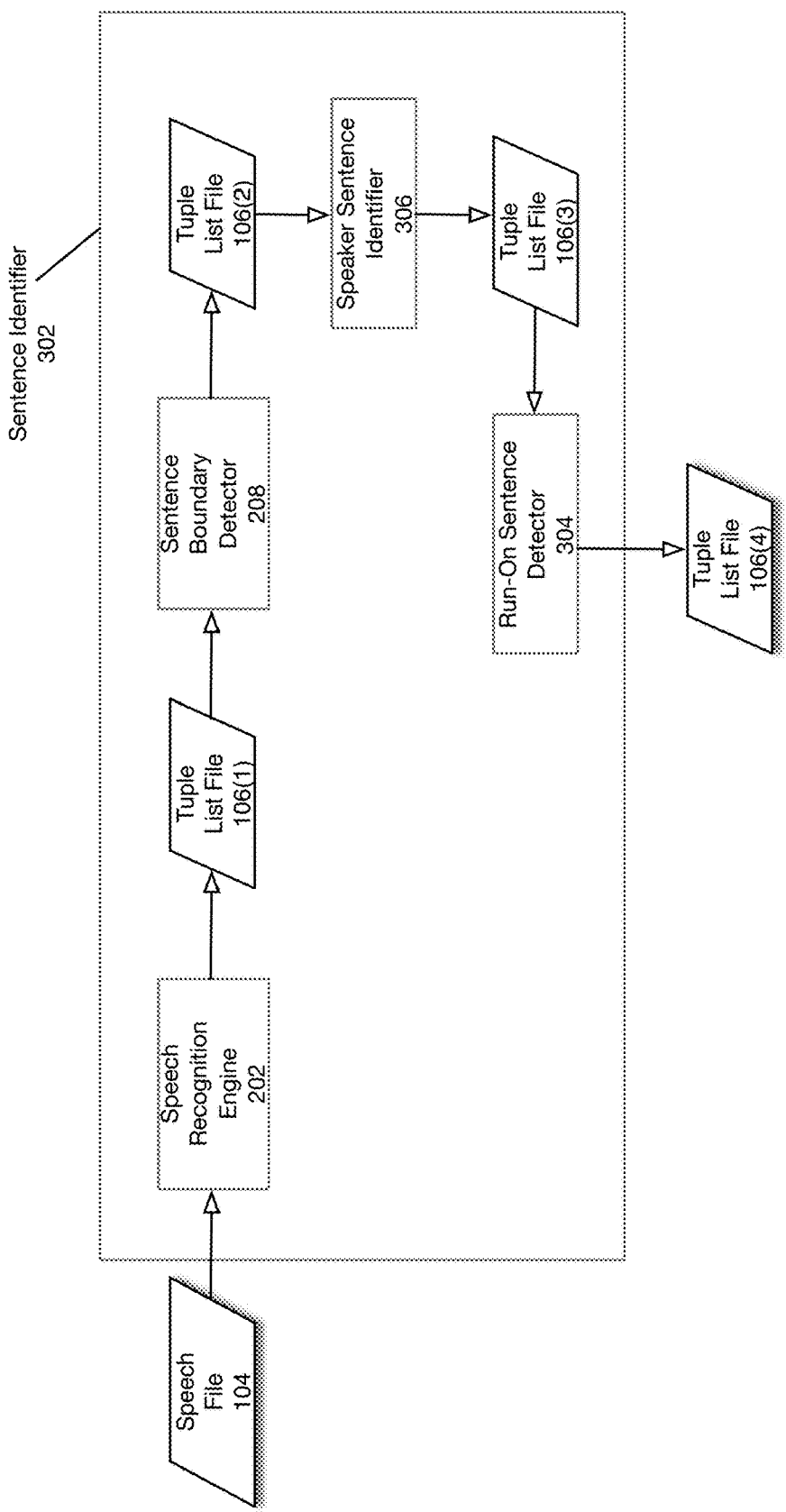
FIG. 3b is a block diagram of a sentence identifier according to one embodiment of the present disclosure.

FIG. 3b is a block diagram of a sentence identifier according to one embodiment of the present disclosure. As shown in FIG. 3a, sentence identifier 302 further comprises speech recognition engine 202, sentence boundary detector 208, speaker identifier 306 and run-on sentence detector 304. Speech file 104 is received by sentence identifier 302, where it is processed by speech recognition engine 202 to generate tuple list file 106(1). Tuple list file 106(1) is then processed by sentence boundary detector 208 (described above with respect to FIG. 2a), which generates tuple list file 106(2). Tuple list file 106(2) is processed by speaker identifier 306 to generate tuple list file 106(3). Tuple list file 106(3) is processed by run-on sentence detector 304 to generate tuple-list file 106(4).

Figure 4:
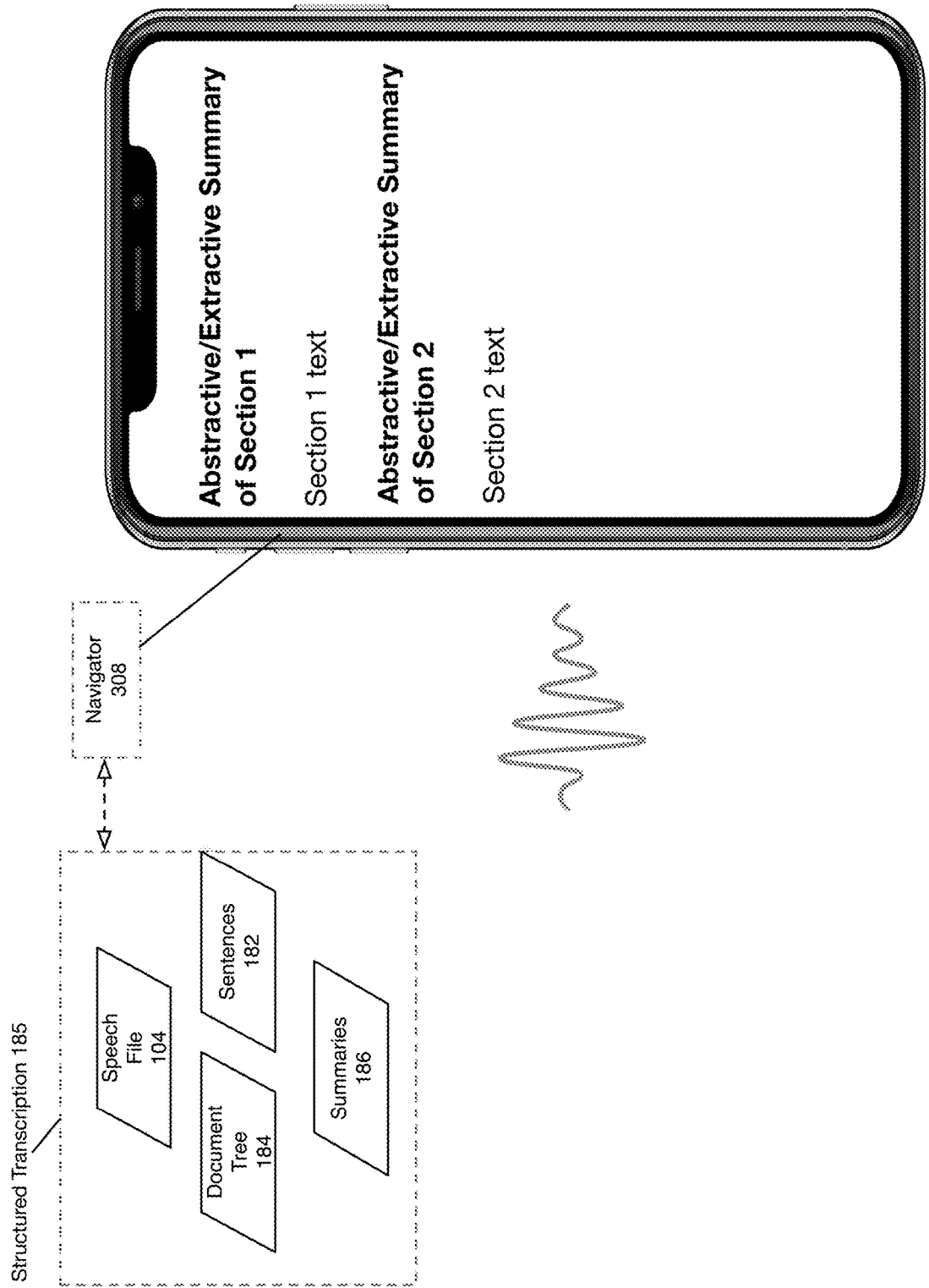
FIG. 4 illustrates a user interface for performing navigation of a structured transcription according to one embodiment of the present disclosure.

FIG. 4 illustrates a user interface for performing navigation of a structured transcription according to one embodiment of the present disclosure.

Integration in Computing System and Network Environment

Figure 5A:
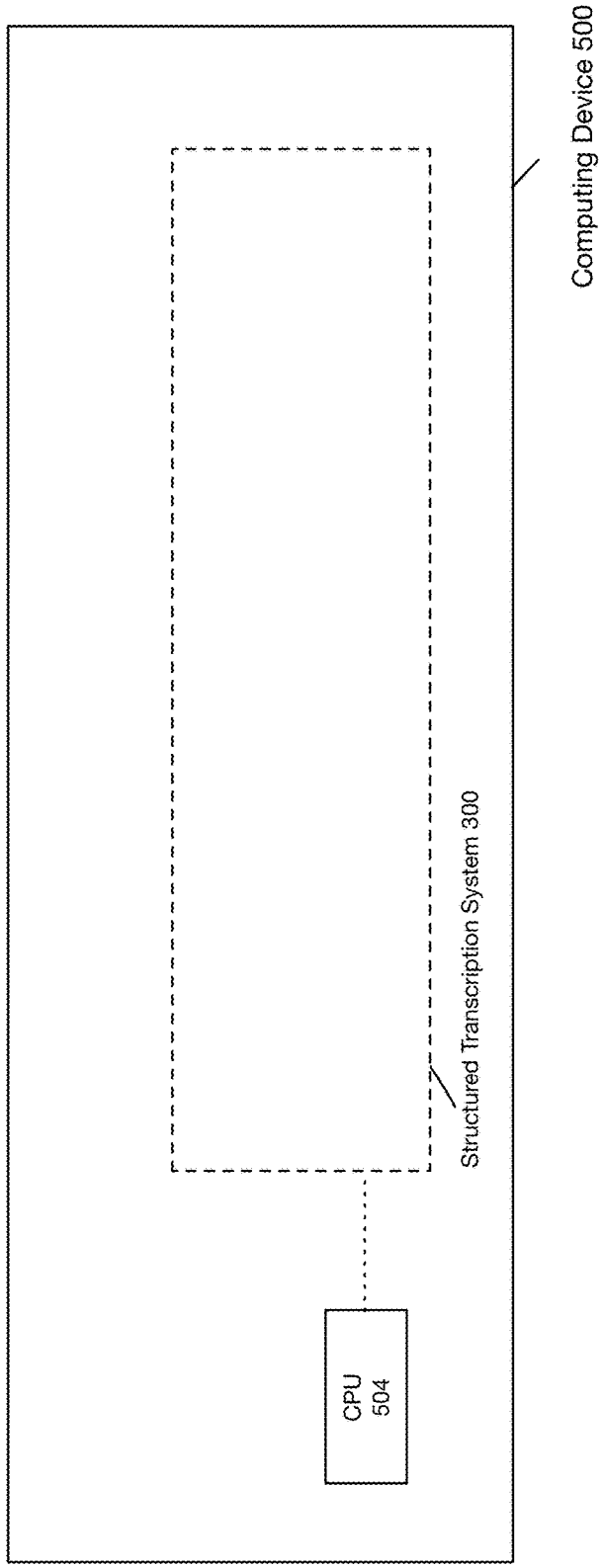
FIG. 5a illustrates an example computing system that executes a structured transcription system according to one embodiment of the present disclosure.

FIG. 5a illustrates an example computing system that executes a structured transcription system 300 according to one embodiment of the present disclosure. As depicted in FIG. 5a, computing device 500 may include CPU 504 that executes one or more processes to perform Structured Transcription System 300. In particular, CPU 504 may be further configured via programmatic instructions to execute Structured Transcription System 300 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 500 can be any stand-alone computing platform, such as a desk top or work station computer, laptop computer, tablet computer, smart phone or personal digital assistant, game console, set-top box, or other suitable computing platform.

Figure 5B:
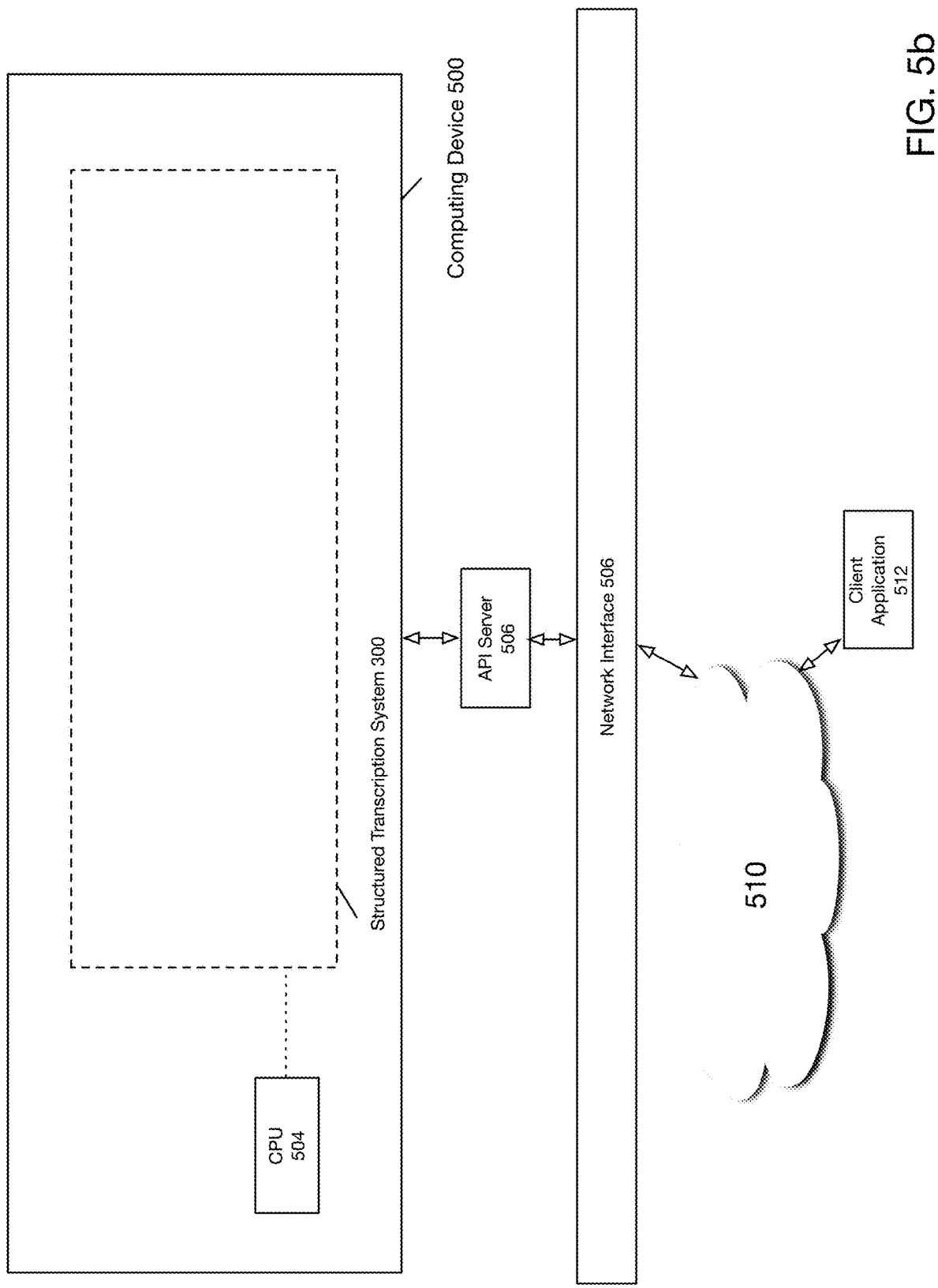
FIG. 5b illustrates an example integration of a structured transcription system into a network environment according to one embodiment of the present disclosure.

FIG. 5b illustrates an example integration of a structured transcription system 300 into a network environment according to one embodiment of the present disclosure. As depicted in FIG. 5b, computing device 500 may be collocated in a cloud environment, data center, local area network ("LAN") etc. Computing device 500 shown in FIG. 5b is structured identically to the example embodiment described with respect to FIG. 5a. As shown in FIG. 5b, client application 512 may interact with computing device 500 via network 510. In particular, client application 512 may make requests and receive responses via API calls received at API server 506, which are transmitted via network 510 and network interface 508.

It will be understood that network 510 may comprise any type of public or private network including the Internet or LAN. It will be further readily understood that network 510 may comprise any type of public and/or private network including the Internet, LANs, WAN, or some combination of such networks. In this example case, computing device 500 is a server computer, and client application 512 may be any typical personal computing platform As will be further appreciated, computing device 500, whether the one shown in FIG. 5a or 65, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 340, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

Further Example Embodiments

The following examples pertain to further embodiments, from which numerous permutations and configurations will be apparent.

Example 1 is a method for generating a structured transcription of a speech file, the method comprising processing said speech file to determine at least one sentence, processing said at least one sentence to generate a document tree structure comprising a plurality of sections, converting said speech file to text, generating a highlighted representation of said text by computing term-frequency vectors based on said text, performing a highlighting operation on each sentence by performing a binary classification based upon a maximum term-frequency vector associated with said sentence and acoustic features associated with said sentence, if said binary classification outputs a pre-determined value, performing a formatting operation to highlight said sentence, performing an interactive navigation of said document based upon said speech file, said document tree structure and said highlighted representation.

Example 2 includes the subject matter of Example 1, wherein processing said at least one sentence to generate a document tree structure comprises generating a sentence embedding for each sentence, and, processing said sentence embedding to output a binary value indicating whether said sentence concludes a section.

Example 3 includes the subject matter of Example 1 or 2, wherein processing said at least one sentence to generate a document tree structure comprises performing a TextTiling process.

Example 4 includes the subject matter of Example 1, 2 or 3, wherein said summary comprises an extractive summary, or an abstractive summary, or both an extractive summary and an abstractive summary.

Example 5 includes the subject matter of Example 4, wherein said extractive summary is utilized to perform text highlighting.

Example 6 includes the subject matter of Example 3, 4 or 5, wherein processing said at least one sentence to generate a document tree structure further comprises segmenting said at least one sentence into at least one segment, utilizing said at least one segment to generate at least one section, and, constructing said document tree from said at least one section.

Example 7 includes the subject matter of any of the preceding Examples, wherein processing said speech file to determine at least one sentence comprises performing an automatic speech recognition ("ASR") on said speech file to generate a first file, processing said first file to determine sentences to generate a second file, and, processing said second file to decompose run-on sentences into smaller logical sentences to generate a third file.

Example 8 includes the subject matter of Example 7, further comprising processing said third file to associate sentences with respective speakers to generate a fourth file.

Example 9 is a system for processing a speech file, the system comprising a sentence identifier, wherein said sentence identifier generates at least one sentence from said speech file, a summarizer, wherein said summarizer generates at least one summary based upon said at least one sentence, a document tree analyzer, wherein said document tree analyzer generates a document tree structure, a document highlighting module for generating a highlighted textual representation of said speech file, wherein said document highlighting module further comprises a term-frequency vector computation module for generating term-frequency vectors, a binary classifier for performing a binary classification of each sentence based upon a maximum term-frequency vector associated with said sentence and acoustic features associated with said sentence, and, a navigator, wherein said navigator performs an interactive navigation of said document based upon said speech file, said document tree structure and said highlighted textual representation.

Example 10 includes the subject matter of Example 9, wherein each of said at least one summary comprises an abstractive summary and an extractive summary.

Example 11 includes the subject matter of Example 9 or 10, wherein said document tree analyzer generates said document tree structure using a TextTiling process.

Example 12 includes the subject matter of Example 9, 10 or 11, wherein said sentence identifier comprises a speech recognition engine, wherein said speech recognition engine generates a text representation of said speech file, a sentence boundary detector, wherein said sentence boundary detector generates at least one sentence based upon said text representation, a run-on sentence detector, wherein said run-on sentence-detector splits a run-on sentence into at least two sentences, and, a speaker sentence identifier, wherein said speaker sentence identifier associates each of said at last one sentence with a respective speaker.

Example 13 includes the subject matter of Example 9, 10, 11, or 12, wherein said document tree analyzer segments said at least one sentence into at least one segment, utilizes said at least one segment to generate at least one section, and, constructs said document tree from said at least one section.

Example 14 includes the subject matter of Example 9, 10, 11, 12 or 13, wherein said document tree analyzer generates a sentence embedding for each sentence and, processes said sentence embedding to output a binary value indicating whether said sentence concludes a section.

Example 15 is a computer program product including one or more non-transitory machine-readable mediums encoded with instructions that when executed by one or more processors cause a process to be carried out for processing a speech file, the process comprising processing said speech file to determine at least one sentence, processing said at least one sentence to generate a document tree structure comprising a plurality of sections, converting said speech file to text, generating a highlighted representation of said text by computing term-frequency vectors based on said text, performing a highlighting operation on each sentence by performing a binary classification based upon a maximum term-frequency vector associated with said sentence and acoustic features associated with said sentence, if said binary classification outputs a pre-determined value, performing a formatting operation to highlight said sentence, performing an interactive navigation of said document based upon said speech file, said document tree and said highlighted representation.

Example 16 includes the subject matter of Example 15, wherein processing said at least one sentence to generate a document tree structure comprises generating a sentence embedding for each sentence, and, processing said sentence embedding to output a binary value indicating whether said sentence concludes a section.

Example 17 includes the subject matter of Example 15 or 16, wherein processing said at least one sentence to generate a document tree structure comprises performing a TextTiling process.

Example 18 includes the subject matter of Example 15, 16 or 17, wherein said summary comprises an extractive summary, or an abstractive summary, or both an extractive summary and an abstractive summary.

Example 19 includes the subject matter of Example 18, wherein said extractive summary is utilized to perform text highlighting.

Example 20 includes the subject matter of Example 15, 16, 17, 18 or 19, wherein processing said speech file to determine at least one sentence further comprises performing an automatic speech recognition ("ASR") on said speech file to generate a first file, processing said first file to determine sentences to generate a second file, and, processing said second file to decompose run-on sentences into smaller logical sentences to generate a third file.

What is claimed is:

1. A method for generating a structured transcription of a speech file, the method comprising:
    converting said speech file to text;
    processing said speech file to determine at least one sentence;
    processing said at least one sentence to generate a document tree structure comprising a plurality of sections;
    generating a highlighted representation of said text by:
        computing term-frequency vectors based on said text, and,
        performing a highlighting operation on each sentence by performing a binary classification based upon a maximum term-frequency vector associated with said sentence and acoustic features associated with said sentence, and in response to said binary classification outputting a pre-determined value, performing a formatting operation to highlight said sentence; and,
    performing an interactive navigation of said structured transcription based upon said speech file, said document tree structure and said highlighted representation.

2. The method according to claim 1, wherein processing said at least one sentence to generate said document tree structure comprises outputting a binary value indicating whether said at least one sentence concludes one of said sections.

3. The method according to claim 1, wherein processing said at least one sentence to generate said document tree structure comprises performing a TextTiling process.

4. The method according to claim 1, further comprising generating, based upon said at least one sentence, an extractive summary, or an abstractive summary, or both an extractive summary and an abstractive summary.

5. The method according to claim 4, wherein said extractive summary is utilized to perform text highlighting.

6. The method according to claim 3, wherein processing said at least one sentence to generate said document tree structure further comprises:
    segmenting said at least one sentence into at least one segment;
    utilizing said at least one segment to generate at least one of said sections; and,
    constructing said document tree from said at least one generated section.

7. The method according to claim 1, wherein processing said speech file to determine at least one sentence comprises:
    performing an automatic speech recognition ("ASR") on said speech file to generate a first file;
    processing said first file to determine said at least one sentence to generate a second file; and,
    processing said second file to decompose run-on sentences into smaller logical sentences to generate a third file.

8. The method according to claim 7, further comprising processing said third file to associate said at least one sentence with a respective speaker to generate a fourth file.

9. A system for processing a structured transcription of a speech file, the system comprising:
    a sentence identifier, wherein said sentence identifier generates at least one sentence from said speech file;
    a summarizer, wherein said summarizer generates at least one summary based upon said at least one sentence;
    a document tree analyzer, wherein said document tree analyzer generates a document tree structure;
    a document highlighting module for generating a highlighted textual representation of said speech file, wherein said document highlighting module further comprises:
        a term-frequency vector computation module for generating term-frequency vectors, and
        a binary classifier for performing a binary classification of each sentence based upon a maximum term-frequency vector associated with said sentence and acoustic features associated with said sentence; and,
    a navigator, wherein said navigator performs an interactive navigation of said structured transcription based upon said speech file, said document tree structure and said highlighted textual representation.

10. The system according to claim 9, wherein each of said at least one summary comprises an abstractive summary and an extractive summary.

11. The system according to claim 9, wherein said document tree analyzer generates said document tree structure using a TextTiling process.

12. The system according to claim 9, wherein said sentence identifier comprises:
    a speech recognition engine, wherein said speech recognition engine generates a text representation of said speech file;
    a sentence boundary detector, wherein said sentence boundary detector generates said at least one sentence based upon said text representation;
    a run-on sentence detector, wherein said run-on sentence-detector splits a run-on sentence into at least two shorter sentences; and,
    a speaker sentence identifier, wherein said speaker sentence identifier associates each of said at last one sentence with a respective speaker.

13. The system according to claim 9, wherein said document tree analyzer:

segments said at least one sentence into at least one segment;

utilizes said at least one segment to generate at least one section; and, constructs said document tree structure from said at least one section.

14. The system according to claim 9, wherein said document tree analyzer outputs a binary value indicating whether said at least one sentence concludes a section.

15. A computer program product including one or more non-transitory machine-readable mediums encoded with instructions that when executed by one or more processors cause a process to be carried out for processing a structured transcription of a speech file, the process comprising:

converting said speech file to text;

processing said speech file to determine at least one sentence;

processing said at least one sentence to generate a document tree structure comprising a plurality of sections;

generating a highlighted representation of said text by:
computing term-frequency vectors based on said text, and, performing a highlighting operation on each sentence by performing a binary classification based upon a maximum term-frequency vector associated with said sentence and acoustic features associated with said sentence, and in response to said binary classification outputting a pre-determined value, performing a formatting operation to highlight said sentence; and, performing an interactive navigation of said structured transcription based upon said speech file, said document tree structure and said highlighted representation.

16. The computer program product according to claim 15, wherein processing said at least one sentence to generate said document tree structure comprises outputting a binary value indicating whether said at least one sentence concludes one of said sections.

17. The computer program product according to claim 15, wherein processing said at least one sentence to generate said document tree structure comprises performing a Text-Tiling process.

18. The computer program product according to claim 15, wherein said process further comprises generating, based upon said at least one sentence, an extractive summary, or an abstractive summary, or both an extractive summary and an abstractive summary.

19. The computer program product according to claim 18, wherein said extractive summary is utilized to perform text highlighting.

20. The computer program product according to claim 15, wherein processing said speech file to determine said at least one sentence further comprises:

performing an automatic speech recognition ("ASR") on said speech file to generate a first file;

processing said first file to determine said at least one sentence to generate a second file; and, processing said second file to decompose run-on sentences into smaller logical sentences to generate a third file.

* * * * *